United States Patent
Wang

(10) Patent No.: US 9,537,945 B2
(45) Date of Patent: Jan. 3, 2017

(54) SYSTEM AND METHOD FOR DETERMINING A DISPLAY DEVICE'S BEHAVIOR BASED ON A DYNAMICALLY-CHANGING EVENT ASSOCIATED WITH ANOTHER DISPLAY DEVICE

(71) Applicant: Dynasign Corporation, Fremont, CA (US)

(72) Inventor: Ping Wang, Fremont, CA (US)

(73) Assignee: Dynasign Corporation, Fremont, CA (US)

( * ) Notice: Subject to any disclaimer, the term of this patent is extended or adjusted under 35 U.S.C. 154(b) by 278 days.

(21) Appl. No.: 13/765,680

(22) Filed: Feb. 12, 2013

(65) Prior Publication Data

US 2014/0229518 A1    Aug. 14, 2014

(51) Int. Cl.
*H04L 29/08* (2006.01)
*G06F 3/14* (2006.01)
(Continued)

(52) U.S. Cl.
CPC .......... *H04L 67/104* (2013.01); *G06F 3/1438* (2013.01); *G06F 3/1454* (2013.01); *G09G 5/363* (2013.01);
(Continued)

(58) Field of Classification Search
CPC .............. G06F 3/00; G06F 3/01; G06F 3/017; G06F 3/048; G06F 3/14; G06F 3/1423; G06F 3/1438; G06F 3/147; H04L 67/10; H04L 67/104; H04L 67/38; G09G 5/363; G09G 2370/06; G09G 2370/08
See application file for complete search history.

(56) References Cited

U.S. PATENT DOCUMENTS 8,046,701 B2 * 10/2011 Chiu et al. .................... 715/761
2008/0098305 A1 * 4/2008 Beland ......................... 715/719
(Continued)

FOREIGN PATENT DOCUMENTS

WO    WO 2012091185 A1 *   7/2012

*Primary Examiner* — Brian J Gillis
*Assistant Examiner* — Gil H. Lee
(74) *Attorney, Agent, or Firm* — Invent Capture, LLC.; Samuel S. Cho

(57) ABSTRACT

Systems and methods for determining a display device's behavior based on a dynamically-changing event associated with another display device are disclosed. In one example, a peer-to-peer distributed data network system comprises a first display device that operates a peer-to-peer distributed system application, which detects a dynamically-changing event associated with a second display device to either maintain or change the first display device's current behavior. In one example, the dynamically-changing event is a change of display content, new sensory information, or another new event for the second display device. If the peer-to-peer distributed system application determines that the dynamically-changing event of the second display device merits a change in the first display device's current behavior, the first display device's current behavior may be replaced by a new device behavior, such as switching from a currently-shown content or a user interface menu to a different content or a different menu.

20 Claims, 7 Drawing Sheets

(51) Int. Cl.
 *H04L 29/06* (2006.01)
 *G09G 5/36* (2006.01)
(52) U.S. Cl.
 CPC .......... *H04L 67/38* (2013.01); *G09G 2370/06* (2013.01); *G09G 2370/08* (2013.01)

(56) References Cited

U.S. PATENT DOCUMENTS

| | | | |
|---|---|---|---|
| 2008/0254888 A1* | 10/2008 | Morio | A63F 13/10 463/42 |
| 2011/0119616 A1* | 5/2011 | Suzuki | 715/772 |
| 2012/0236045 A1* | 9/2012 | Tamura et al. | 345/690 |
| 2013/0045803 A1* | 2/2013 | Kang | G07F 17/3223 463/42 |

* cited by examiner

A peer-to-peer distributed network configuration of display devices with input sensors A peer-to-peer distributed network configuration of display devices with input sensors, which are additionally connected to a computer server A system diagram embodiment of a display panel as a node of a peer-to-peer distributed network configuration

SYSTEM AND METHOD FOR DETERMINING A DISPLAY DEVICE'S BEHAVIOR BASED ON A DYNAMICALLY-CHANGING EVENT ASSOCIATED WITH ANOTHER DISPLAY DEVICE

BACKGROUND OF THE INVENTION

The present invention generally relates to networked or connected display devices. More specifically, the present invention relates to systems and methods for determining a display device's behavior and information display content based on a dynamically-changing event associated with another display device. Furthermore, the present invention also relates to a peer-to-peer distributed system connection of display devices for management, information presentation, and behavioral changes among a plurality of display devices.

Display devices are commonly deployed near each other in commercial buildings, shopping malls, and other publicly-accessible locations. Clustering a multiple number of display devices near each other in public or commercial locations can create an effective marketing and information dissemination environment by displaying either the same information in the multiple number of displays or different but related information in the multiple number of displays. Therefore, advertisers, shop owners, and other commercial building entities increasingly deploy a clustered group of display devices at highly-visible locations as effective marketing tools to consumers.

A conventional method of displaying information in a multiple number of display devices typically involves a centralized server-based display content management. For example, a computer server connected to a plurality of display devices stores display content information in its information storage, and a program executed in the computer server manages each connected display device to display a particular content at a particular time. In some cases, the computer server also transfers information to be displayed on each displayed device. In other cases, the computer server simply instructs each display device to play a particular content already locally stored in each display device. This conventional method of display content management generally involves showing a preset visual slide sequence, in which a set of scheduled multimedia information is displayed in each display device.

The centralized server-based display content management that merely shows a preset visual slide sequence in display devices connected to the server has several drawbacks. For example, if a computer server malfunctions or something is wrong with the display content management program executed by the computer server, all contents that are supposed to be displayed by a plurality of display devices become inoperable. Furthermore, displaying the preset visual slide sequence in each display device according to the display content management program executed in a computer server, as embodied by the conventional method of display content management, does not accommodate adaptive, peer-to-peer, behavioral, and display information changes on a plurality of display devices based on a dynamically-changing event associated with one particular display device. In numerous situations, a more personalized and custom visualization environment for consumers and other users may be achieved if display devices located near a particular display device can adaptively and dynamically change display contents based on a dynamically-changing event on the particular display device.

Therefore, it may be desirable to provide one or more systems and methods that can determine a display device's behavior and information to be displayed based on a dynamically-changing event associated with another display device. Furthermore, it may also be desirable to provide a peer-to-peer distributed network of display devices for adaptive behavioral changes, information sharing, and display content change triggers among a plurality of peer display devices, wherein each peer display device does not entirely depend on a centralized computer server for all aspects of display content management and distribution. In addition, it may also be desirable to utilize such novel systems and methods to provide personalized and adaptive information dissemination and marketing environments using a plurality of display devices.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a peer-to-peer distributed data network system for a plurality of display devices is disclosed. This peer-to-peer distributed data network system comprises: a first display device comprising a first display panel, a first central processing unit (CPU), a first memory unit, a first graphics unit, a first power management unit, a first external communication interface, and a first input sensor interface, wherein the first CPU and the first memory unit execute a first peer-to-peer distributed system application configured to detect a second dynamically-changing event associated with a second display device to either maintain or change the first display device's current behavior; and a second display device comprising a second display panel, a second central processing unit (CPU), a second memory unit, a second graphics unit, a second power management unit, a second external communication interface, and a second input sensor interface, wherein the second CPU and the second memory unit execute a second peer-to-peer distributed system application configured to detect a first dynamically-changing event associated with the first display device to either maintain or change the second display device's current behavior.

In another embodiment of the invention, a method for determining a first display device's behavior based on a dynamically-changing event associated with a second display device is disclosed. This method comprises the steps of: executing a first peer-to-peer distributed system application program on a first CPU and a first memory unit of the first display device, wherein the first peer-to-peer distributed system application program is configured to keep track of which other display devices are currently and operatively connected to the first display device for peer-to-peer communication; executing a second peer-to-peer distributed system application program on a second CPU and a second memory unit of the second display device, wherein the second peer-to-peer distributed system application program is configured to keep track of which other display devices are currently and operatively connected to the second display device for the peer-to-peer communication; detecting the dynamically-changing event from the second display device using the first peer-to-peer distributed system application program of the first display device and the second peer-to-peer distributed system application program of the second display device; determining whether the dynamically-changing event from the second display device merits a change in the first display device's behavior using the first peer-to-peer distributed system application program of the first display device; and if the dynamically-changing event from the second display device merits the change in the first display device's behavior: changing the first display device's behavior to a new behavior; updating a status for the first peer-to-peer distributed system application program; and communicating to the second display device and any other connected display devices regarding the updated status of the first display device.

DETAILED DESCRIPTION

Figure 1:
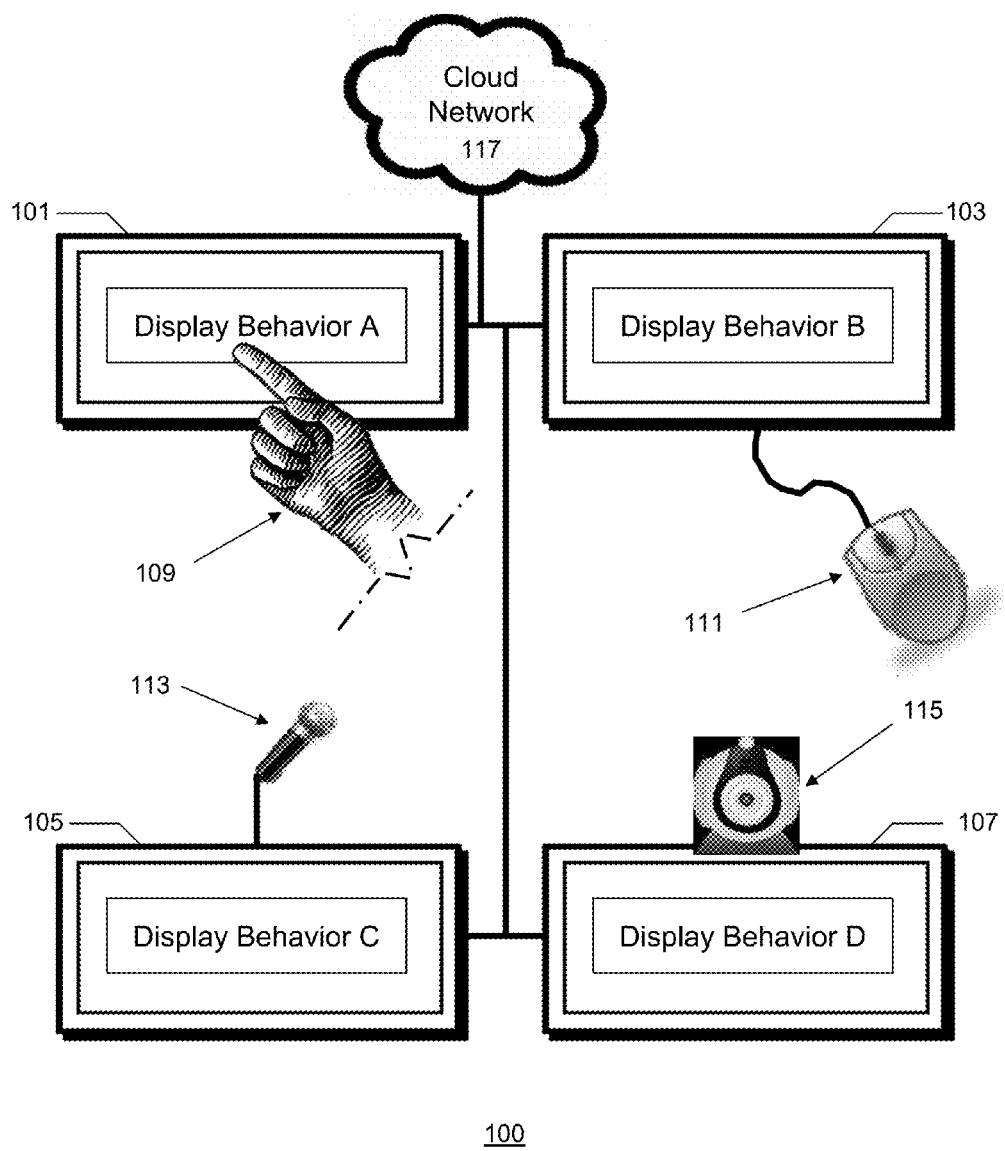
FIG. 1 shows a peer-to-peer distributed network configuration of display devices which incorporate input sensors, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble a system and a method for determining a display device's behavior and information display content based on a dynamically-changing event associated with another display device. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

For the purpose of describing the invention, terms such as "distributed system," "distributed network," "peer-to-peer system," "peer-to-peer network," or any combination thereof are used to refer to an electronic device connection configuration in which a plurality of devices are able to share, transfer, and act on information via device-to-device communications even without a computer server or another centrally-managing entity. In one embodiment of the invention, a computer server or another centrally-managing entity may not exist at all within system connections or within a data network, so that peer-to-peer communications perform all desirable tasks of information communications among a plurality of devices. In another embodiment of the invention, a computer server or another centrally-managing entity may be connected as a node within system connections or within a data network to perform a centralized management of connected devices in one operation mode, while also providing peer-to-peer communications among connected devices in another operation mode that does not require intervention or housekeeping from the computer server.

Furthermore, for the purpose of describing the invention, a term "behavior" is defined as one or more observable, inherent, and/or representative characteristics of an electronic device. For example, a display device's "behavior" refers to the display device's observable characteristics such as displaying a particular content, providing an interactive user interface to a user via a touch screen or another input sensor, enabling mute or un-mute on a speaker connected to the display device, or another device characteristics that are observable, inherent, and/or representative of the display device. In one embodiment of the invention, examples of a display device's behavioral changes include switching to display a new content closely associated with another new content displayed by a neighboring display device, switching to a different user interface menu on a touch screen due to a dynamic change in the neighboring display device, sensing a different type of user feedback (e.g. from a microphone to a touch sensor, from a webcam to a mouse, from a webcam to an NFC reader, and etc.) as a result of a dynamic change in the neighboring display device, or another change of the display device's observable, inherent, and/or representative characteristics.

In addition, for the purpose of describing the invention, terms such as "display content" and "information display content" refers to video or other multimedia information presented by one or more display devices. For example, a change of display content or information display content means replacement or switchover from a first video or a first set of multimedia information to a second video or a second set of multimedia information.

Moreover, for the purpose of describing the invention, a term "cloud network" is defined as a group of computing resources operatively connected to a local network, wherein the group of computing resource may provide networked data storage, data transfers, or another computing-related task to an electronic device situated within the local network. In one example of network configuration, a plurality of display devices may be connected to each other and form a local network, and a cloud network may be also connected to this local network. In this example, the cloud network may serve as a remotely-networked data storage or another computing-related resource to one or more display devices in the local network.

In addition, for the purpose of describing the invention, a term "display device" is defined as a dedicated or standalone display unit (e.g. a big-screen LCD monitor, an LCD television, and etc.), a mobile electronic device with an integrated display screen (e.g. a cellular phone, a portable gaming device, a tablet device, and etc.), and/or another electronic device with a display screen.

One aspect of an embodiment of the present invention is providing a system for determining a display device's behavior and information display content based on a dynamically-changing event associated with another display device.

Another aspect of an embodiment of the present invention is providing a method for determining a display device's behavior and information display content based on a dynamically-changing event associated with another display device.

Yet another aspect of an embodiment of the present invention is providing a peer-to-peer distributed network configuration for a plurality of display devices, which do not have to depend on a centralized computer server for at least some aspects of display content management, content distribution, display device behavioral changes, and peer-to-peer information sharing.

In addition, another aspect of an embodiment of the present invention is providing personalized and adaptive information dissemination and marketing environments using a plurality of display devices that dynamically determines new display content to be displayed or another device behavior based on a dynamically-changing event experienced by a particular display device among the plurality of display devices.

FIG. 1 shows a peer-to-peer distributed network system configuration (100) of display devices which incorporate input sensors, in accordance with an embodiment of the invention. In one embodiment of the invention, the peer-to-peer distributed network system configuration (100) comprises a first display device (101) with a touch-sensitive (i.e. 109) user interface as an input sensor, a second display device (103) with a mouse (111) as an input sensor, a third display device (105) with a microphone (113) as an input sensor, and a fourth display device (107) with a webcam (115) as an input sensor. In another embodiment of the invention, near-field communication (NFC) readers, radio frequency identification (RFID) tag readers, and/or other electronic sensors can be used as input sensors, which are operatively connected to and associated with one or more display devices. Furthermore, in one embodiment of the invention, "Display Behavior A," "Display Behavior B," "Display Behavior C," and "Display Behavior D" each represents a current behavior of a corresponding display device (101, 103, 105, and 107, respectively).

In a preferred embodiment of the invention, each display device (101, 103, 105, 107) has a CPU and a memory unit that can execute one or more peer-to-peer distributed system application programs, which are each configured to detect a dynamically-changing event associated with another display device on a peer-to-peer distributed network. In the preferred embodiment of the invention, the dynamically-changing event may be a change of display content, new sensory information, or another new event for a display device that is peer-to-peer connected to other display devices.

For example, as shown in FIG. 1, if a user navigates through a display menu provided by "Display Behavior B" using the mouse (111) for the second display device (103) to cause a dynamically-changing event (e.g. a change of display content for the second display device (103), new sensory information via the mouse (111) or another input device, and etc.) in the second display device (103), then the peer-to-peer distributed system application program for the first display device (101) may determine whether to maintain or change the first display device's (101) current behavior, or "Display Behavior A."

In another example, as shown in FIG. 1, if a user speaks a voice command provided by "Display Behavior C" using the microphone (113) for the third display device (105) to cause a dynamically-changing event (e.g. a change of display content for the third display device (105), new sensory information via the microphone (113) or another input device, and etc.) in the third display device (105), then the peer-to-peer distributed system application program for the fourth display device (107) may determine whether to maintain or change the fourth display device's (107) current behavior, or "Display Behavior D."

In one embodiment of the invention, a display device's "behavior" is associated with displaying a particular display content, providing a particular interactive user interface menu to a user via a touch screen, and/or providing a certain audio output for the display device. Furthermore, in one embodiment of the invention, a change in the display device's current behavior may involve switching from a currently-shown content to a new display content, switching from a currently-used user interface menu to a different user interface menu, and/or changing audio volume of the display device, if the dynamically-changing event associated with another display device triggers the peer-to-peer distributed system application program of the display device to initiate the change in the display device's current behavior.

Continuing with FIG. 1, in one embodiment of the invention, each of the four display devices (101, 103, 105, 107) executes its own version of a peer-to-peer distributed system application program, and each of the four display devices (101, 103, 105, 107) is capable to tracking which other display devices are currently and operatively connected to itself. Because the peer-to-peer distributed network configuration (100) can change in real time, depending on which display device gets disconnected from or added to the peer-to-peer network, each peer-to-peer distributed system application program in each connected display device (101, 103, 105, 107) can update the current status of other display device connections to itself in real time. Furthermore, such updates of the current status of other display device connections for the peer-to-peer network may be shared with other electronic devices, such as other display devices, a computer server, or a computing resource in a cloud network (117).

In another embodiment of the invention, a particular peer-to-peer distributed system application program for a particular display device may be assigned a role of a master tracking device that has the highest priority among a plurality of display devices for keeping track of current statuses or other display devices. In this embodiment of the invention, a display device with the highest priority gets to track the most up-to-date peer-to-peer connection statuses first before any other display devices' corresponding peer-to-peer distributed system application programs share the updated status information. If the display device with the highest priority is disconnected from the peer-to-peer distributed network (e.g. 100), then a remaining display device on the peer-to-peer distributed network (e.g. 100) with a second highest priority becomes a new master tracking device for all remaining devices connected in the peer-to-peer distributed network (e.g. 100).

Furthermore, in one embodiment of the invention, one or more peer-to-peer distributed system application programs in one or more display devices (101, 103, 105, 107) can maintain a peer-to-peer communication device priority list, which prioritize an order of communication among the one or more display devices (101, 103, 105, 107) mutually connected to each other for peer-to-peer communication.

Moreover, as shown in FIG. 1, in one embodiment of the invention, each display device (101, 103, 105, 107) contains an external communication interface, which can be operatively connected to other external communication interfaces of other display devices (101, 103, 105, 107), so that data and status updates related to changes in display contents or new sensory information from each display device (101, 103, 105, 107) can be shared with other display devices (101, 103, 105, 107).

In addition, in one embodiment of the invention, the peer-to-peer distributed network configuration (100) of display devices further comprises a cloud network (117) operatively connected to at least one of the external communication interfaces for the display devices (101, 103, 105, 107) that form a localized peer-to-peer distributed network of the display devices (101, 103, 105, 107). In this embodiment of the invention, the cloud network (117) is a group of computing resources remotely and operatively connected to the localized peer-to-peer distributed network, wherein the group of computing resource may provide networked data storage, data transfers, or another computing-related task to one or more display devices (101, 103, 105, 107).

Figure 2:
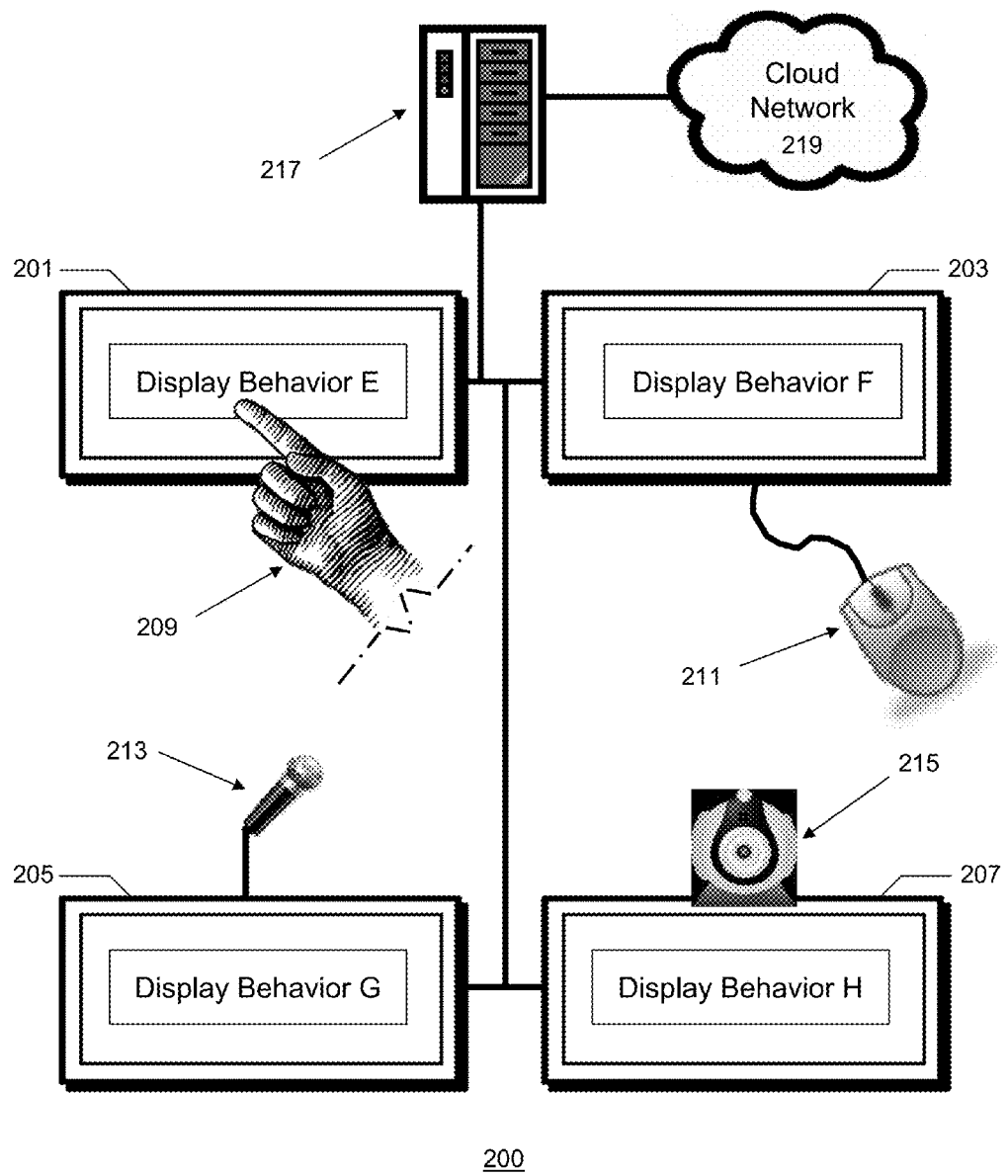
FIG. 2 shows a peer-to-peer distributed network configuration of display devices with input sensors, which are additionally connected to a computer server, in accordance with an embodiment of the invention.

FIG. 2 shows another peer-to-peer distributed network configuration (200) of display devices with input sensors, which are additionally connected to a computer server (217), in accordance with an embodiment of the invention. In this embodiment of the invention, the peer-to-peer distributed network system configuration (200) comprises a first display device (201) with a touch-sensitive (i.e. 209) user interface as an input sensor, a second display device (203) with a mouse (211) as an input sensor, a third display device (205) with a microphone (213) as an input sensor, and a fourth display device (207) with a webcam (215) as an input sensor. In another embodiment of the invention, near-field communication (NFC) readers, radio frequency identification (RFID) tag readers, and/or other electronic sensors can be used input sensors, which are operatively connected to and associated with one or more display devices. Furthermore, in one embodiment of the invention, "Display Behavior E," "Display Behavior F," "Display Behavior G," and "Display Behavior H" each represents a current behavior of a corresponding display device (201, 203, 205, and 207, respectively).

In addition, in this embodiment of the invention, the computer server (217) is operatively connected to a plurality of display devices (201, 203, 205, 207) and a cloud network (219). Preferably, the computer server (217) can control and regulate the flow of network and data traffic between the cloud network (219) and the plurality of display devices (201, 203, 205, 207). In a preferred embodiment of the invention, it may be desirable to maintain the peer-to-peer distributed network configuration (200) among the plurality of display devices (201, 203, 205, 207), without resorting to a centrally-managed display behaviors commanded by the computer server (217). The computer server (217) may also store display contents, user interface-related data, or other information which could be used by the plurality of display devices (201, 203, 205, 207). In an alternative embodiment of the invention, the computer server (217) may serve a centrally-managing role for keeping track of dynamically-changing events in one or more displays and also for determining which display device needs to change its behavior due to a particular event from another display device.

In a preferred embodiment of the invention, each display device (201, 203, 205, 207) has a CPU and a memory unit that can execute one or more peer-to-peer distributed system application programs, which are each configured to detect a dynamically-changing event associated with another display device on a peer-to-peer distributed network. In this preferred embodiment of the invention, the dynamically-changing event may be a change of display content, new sensory information, or another new event for a display device that is peer-to-peer connected to other display devices.

For example, as shown in FIG. 2, if a user speaks a voice command provided by "Display Behavior G" using the microphone (213) for the third display device (205) to cause a dynamically-changing event (e.g. a change of display content for the third display device (205), new sensory information via the microphone (213) or another input device, and etc.) in the third display device (205), then the peer-to-peer distributed system application program for the fourth display device (207) may determine whether to maintain or change the fourth display device's (207) current behavior, or "Display Behavior H."

In another example, as shown in FIG. 2, if a user navigates through a display menu provided by "Display Behavior F" using the mouse (211) for the second display device (203) to cause a dynamically-changing event (e.g. a change of display content for the second display device (203), new sensory information via the mouse (211) or another input device, and etc.) in the second display device (203), then the peer-to-peer distributed system application program for the first display device (201) may determine whether to maintain or change the first display device's (201) current behavior, or "Display Behavior E."

In one embodiment of the invention as shown in FIG. 2, a display device's "behavior" is associated with displaying a particular display content, providing a particular interactive user interface menu to a user via a touch screen, and/or providing a certain audio output for the display device. Furthermore, in one embodiment of the invention, a change in the display device's current behavior may involve switching from a currently-shown content to a new display content, switching from a currently-used user interface menu to a different user interface menu, and/or changing audio volume of the display device, if the dynamically-changing event associated with another display device triggers the peer-to-peer distributed system application program of the display device to initiate the change in the display device's current behavior.

Continuing with FIG. 2, in one embodiment of the invention, each of the four display devices (201, 203, 205, 207) executes its own version of a peer-to-peer distributed system application program, and each of the four display devices (201, 203, 205, 207) is capable to tracking which other display devices are currently and operatively connected to itself. Because the peer-to-peer distributed network configuration (200) can change in real time, depending on which display device gets disconnected from or added to the peer-to-peer network, each peer-to-peer distributed system application program in each connected display device (201, 203, 205, 207) can update the current status of other display device connections to itself in real time. Furthermore, such updates of the current status of other display device connections for the peer-to-peer network may be shared with other electronic devices, such as other display devices, a computer server (217), or a computing resource in a cloud network (219).

In another embodiment of the invention, a particular peer-to-peer distributed system application program for a particular display device may be assigned a role of a master tracking device that has the highest priority among a plurality of display devices for keeping track of current statuses or other display devices. In this embodiment of the invention, a display device with the highest priority gets to track the most up-to-date peer-to-peer connection statuses first before any other display devices' corresponding peer-to-peer distributed system application programs share the updated status information. If the display device with the highest priority is disconnected from the peer-to-peer distributed network (e.g. 200), then a remaining display device on the peer-to-peer distributed network (e.g. 200) with a second highest priority becomes a new master tracking device for all remaining devices connected in the peer-to-peer distributed network (e.g. 200).

Furthermore, in one embodiment of the invention, one or more peer-to-peer distributed system application programs in one or more display devices (201, 203, 205, 207) can maintain a peer-to-peer communication device priority list, which prioritize an order of communication among the one or more display devices (201, 203, 205, 207) mutually connected to each other for peer-to-peer communication.

Moreover, as shown in FIG. 2, in one embodiment of the invention, each display device (201, 203, 205, 207) contains an external communication interface, which can be operatively connected to other external communication interfaces of other display devices (201, 203, 205, 207), so that data and status updates related to changes in display contents or new sensory information from each display device (201, 203, 205, 207) can be shared with other display devices (201, 203, 205, 207) and the computer server (217).

In addition, in one embodiment of the invention, the peer-to-peer distributed network configuration (200) of display devices further comprises a cloud network (219) operatively connected to at least one of the external communication interfaces for the display devices (201, 203, 205, 207) that form a localized peer-to-peer distributed network of the display devices (201, 203, 205, 207). In this embodiment of the invention, the cloud network (219) is a group of computing resources remotely and operatively connected to the localized peer-to-peer distributed network, wherein the group of computing resource may provide networked data storage, data transfers, or another computing-related task to one or more display devices (201, 203, 205, 207).

Figure 3:
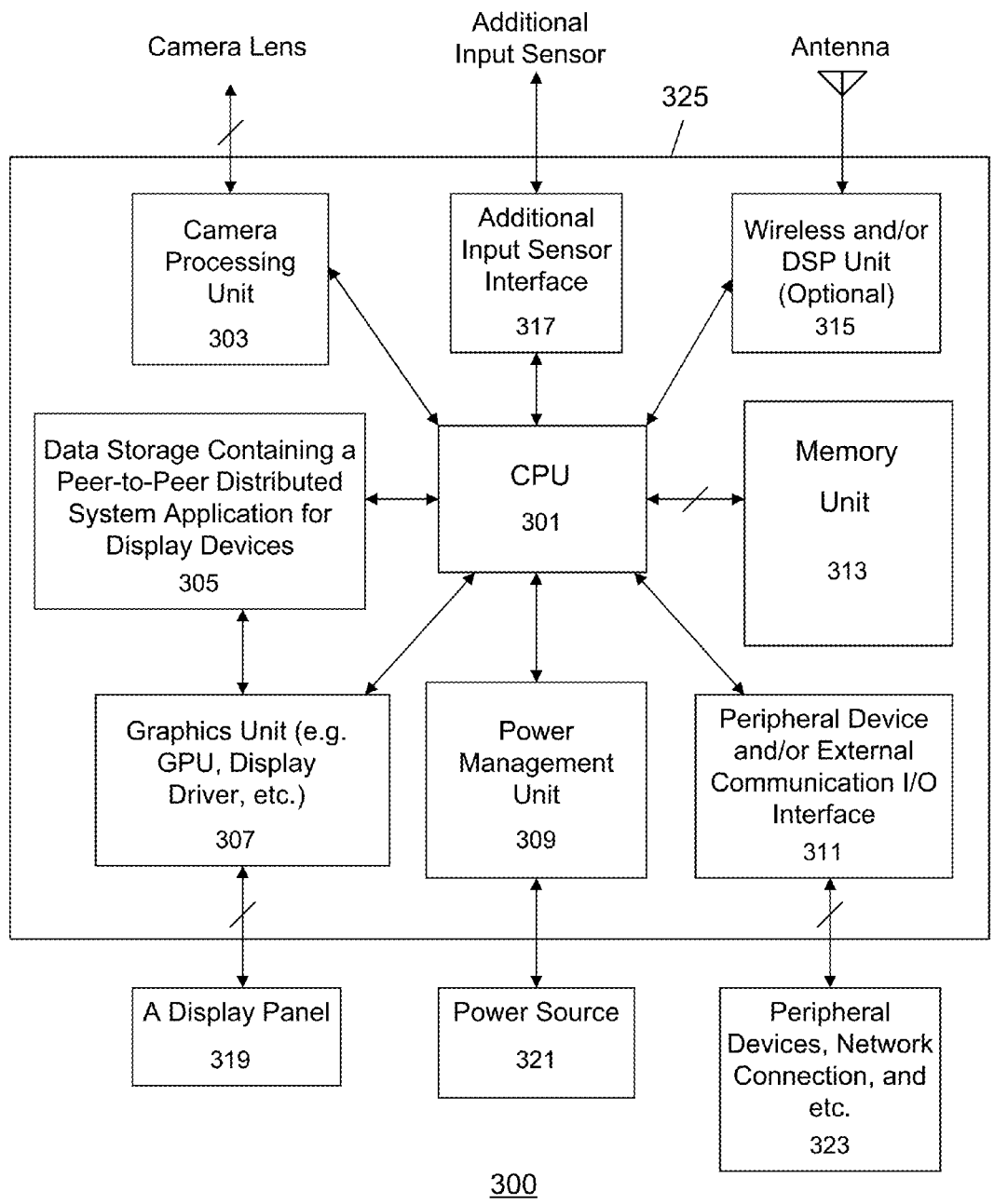
FIG. 3. shows an example of a system diagram of a display panel as a node of a peer-to-peer distributed network configuration, in accordance with an embodiment of the invention.

FIG. 3. shows an example of a system diagram (300) of a display panel as a node of a peer-to-peer distributed network configuration, in accordance with an embodiment of the invention. In a preferred embodiment of the invention, the display panel includes a CPU (301) which is operatively connected to a memory unit (313), a data storage containing a peer-to-peer distributed system application program for one or more display devices (305), a camera processing unit (303), a graphics unit (307) (e.g. a graphics processor, a display driver, and etc.), a power management unit (309), a peripheral device and/or external communication I/O interface (311), an additional input sensor interface (317), a wireless and/or digital signal processing (DSP) unit (315), and a sound unit. These logical units may be placed on a single printed circuit board (325) in one embodiment of the invention, or a plurality of printed circuit boards in another embodiment of the invention.

In the preferred embodiment of the invention, the CPU (301) is configured to control each logical unit operatively (i.e. directly or indirectly) connected to the CPU (301). The memory unit (313) typically comprises volatile memory banks based on DRAM's. In some embodiments of the invention, the memory unit (313) may use non-volatile memory technologies such as SRAM's and/or Flash memory. The memory unit (313) is capable of storing programs and applications which can be executed by the CPU (301), the graphics unit (307), or another logical unit operatively connected to the memory unit (313).

In particular, in the preferred embodiment of the invention, the peer-to-peer distributed system application program and/or other software executed on the CPU (301) and the memory unit (313) inside the display device are capable of keeping track of which other display devices are currently and operatively connected to the display device for peer-to-peer communication. Furthermore, the peer-to-peer distributed system application program is also capable of detecting a dynamically-changing event from another display device, and subsequently determining whether the dynamically-changing event from the other display device merits a change in the display device's own behavior as a reaction to the other display device's dynamically-changing event or another behavioral change. If the peer-to-peer distributed system application program decides to change the display device's behavior as a reaction to the other display device's dynamically-changing event or another behavioral change, then a new behavior, such as switching from a currently-shown content to a new display content, switching from a currently-used user interface menu to a different user interface menu, and/or changing audio volume of the display device, overtakes the display device. Then, a relevant status information associated with the display device can be updated using the peer-to-peer distributed system application program, and further communicated to some or all of peer-to-peer connected display devices via the peripheral device and/or external communication I/O interface (311) and/or the wireless and/or digital signal processing (DSP) unit (315).

Continuing with FIG. 3, any software and programs executed on the CPU (301) and the memory unit (313) of the display device may be part of an operating system, or a separate application installed on the operating system of the display device. Furthermore, in one embodiment of the invention, the data storage containing the peer-to-peer distributed system application program for one or more display devices (305) is also configured to store status information associated with any peer-to-peer connected display devices, display content data, and any other relevant data that need to be stored by the display device.

Furthermore, in one embodiment of the invention, the camera processing unit (303) is operatively connected to a webcam unit or another camera lens, which is operatively attached or integrated to the display device, as shown in FIG. 3. The webcam unit or another camera lens is a source of new sensory information for the display unit. New video information captured by the webcam unit or another camera lens can be construed as a dynamically-changing event for the display device, which in turn can trigger a behavioral change of another display device depending on the type of the new video information. For example, if the webcam unit of the display device and the camera processing unit (303) recognize a customer walking into a viewing angle of the display panel, another display device located nearby may share that visual information via a peer-to-peer network. Then, the peer-to-peer distributed system application program for the other display device may determine that a different advertising display content needs to be displayed by the other display device to match the customer's likely area of interest, because the customer's line of sight also includes the other display panel.

In one embodiment of the invention, the camera processing unit (303) is able to process image-related data from the webcam unit or another camera lens in association with the CPU (301) and/or other logical units in the display device to produce video information captured in real time. This captured video information may be also stored in the data storage containing the peer-to-peer distributed system application program for one or more display devices (305), or in another data storage unit associated with the display device.

Furthermore, in one embodiment of the invention, one or more additional input sensors, such as a microphone, a touch-screen sensor, a computer mouse, and another input-sensing device, may be operatively connected to the additional input sensor interface (317) as one or more sources of sensory information for the display device, wherein some of the one or more sources of sensory information may be construed as a dynamically-changing event that causes a change of behavior by another display device.

Moreover, as shown in FIG. 3, the wireless and/or digital signal processing (DSP) unit (315) is operatively connected to an radio frequency (RF) antenna. The wireless and/or digital signal processing (DSP) unit (315) is generally configured to receive and transmit data and/or voice signals wirelessly for communication with other peer display devices, computer servers, or computing resources in a cloud network. In addition, the power management unit (309) is operatively connected to a power supply unit and a power source (e.g. battery, power adapter) (321), and the power management unit (309) generally controls power supplied to the display device and its logical units. Moreover, the peripheral device and/or external communication I/O interface (311) as shown in FIG. 3 can be operatively connected to one or more peripheral devices, wireless devices, USB ports, and other external data communication media (323).

Continuing with FIG. 3, in the preferred embodiment of the invention, the graphics unit (307) in the system diagram (300) for the display device comprises a graphics processor, a display driver, a dedicated graphics memory unit, and/or another graphics-related logical components. In general, the graphics unit (307) is able to process and communicate graphics-related data with the CPU (301), the display driver, and/or the dedicated graphics memory unit. The graphics unit (307) is also operatively connected to a display panel (319) that shows display contents to a viewer. In addition, the CPU (301) may be operatively connected to the sound unit which contains audio-related logical components for generation or recording of audio data from a microphone operatively connected to the display device.

Figure 4:
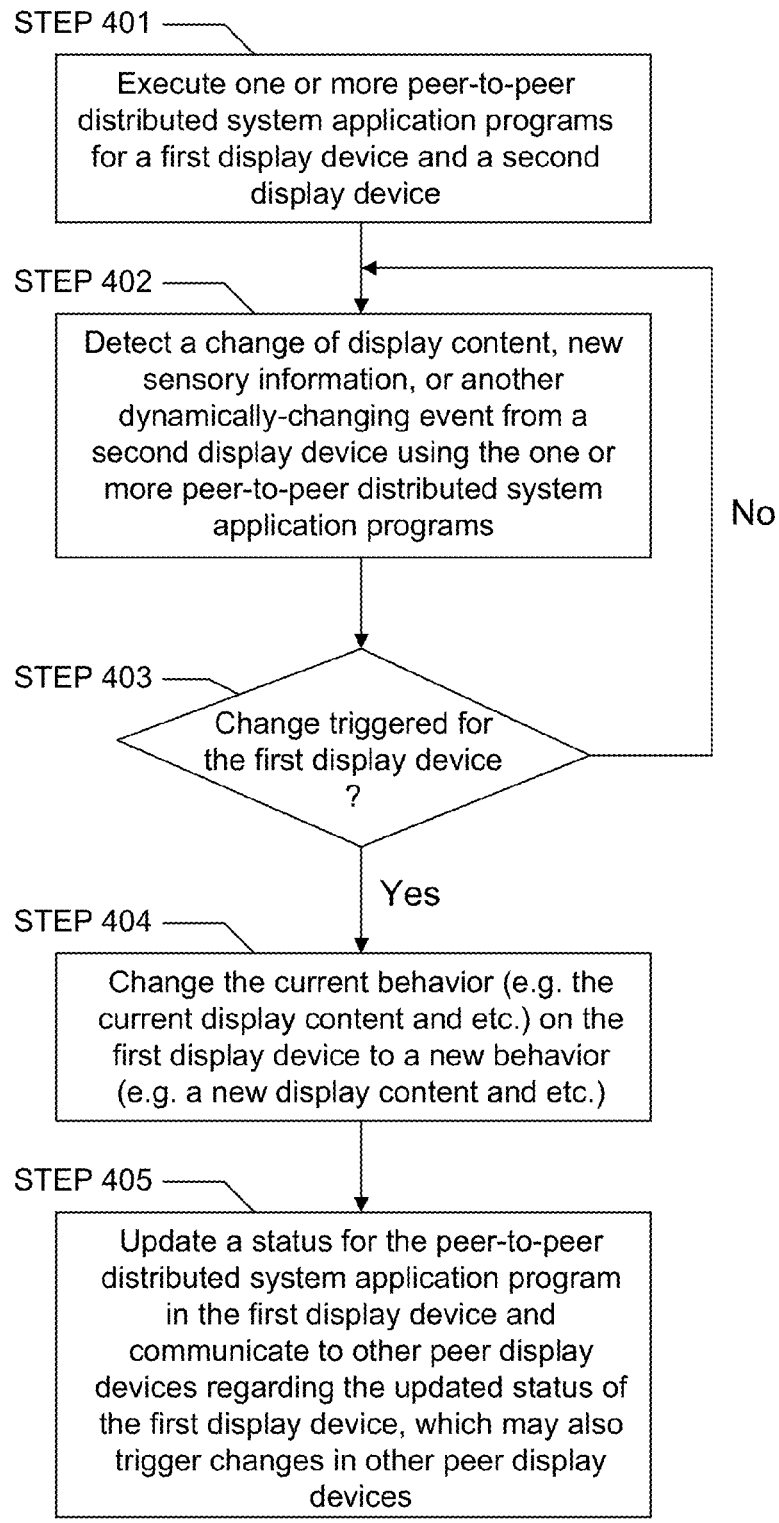
FIG. 4 shows a method of determining a first display device's behavior and information display content based on a dynamically-changing event associated with a second display device, in accordance with an embodiment of the invention.

FIG. 4 shows a method (400) of determining a first display device's behavior and information display content based on a dynamically-changing event associated with a second display device, in accordance with an embodiment of the invention. In one embodiment of the invention, as a first step in this method (400), each of the first display device and the second display device executes its own peer-to-peer distributed system application program on its CPU and its memory unit, as shown in STEP 401. For example, a first peer-to-peer distributed system application program can be executed for the first display device, and a second peer-to-peer distributed system application program can be executed for the second display device.

Then, when a change of display content, new sensory information, or another dynamically-changing event occurs in the second display device, the second peer-to-peer distributed system application program executed in the CPU and the memory unit of the second display device detects the change, and subsequently shares the status associated with the dynamically-changing event with the first peer-to-peer distributed system application program executed in the first display device via a peer-to-peer network, as shown in STEP 402. The first peer-to-peer distributed system application program, in turn, can determine whether the dynamically-changing event of the second display device merits a change in the first display device's behavior, as shown in STEP 403.

Continuing with the method (400) shown in FIG. 4, if the dynamically-changing event from the second display device merits the change in the first display device's behavior, as also shown in STEP 403, then the first peer-to-peer distributed system application program can change the current behavior of the first display device to a new behavior, as shown in STEP 404. On the other hand, if the dynamically-changing event from the second display device does not merit the change in the first display device's behavior, then the first peer-to-peer distributed system application program can loop back to the beginning of STEP 402.

Examples of new behaviors include, but are not limited to, a new display content, a different user interface menu from a currently-used user interface menu, and a changed audio volume of the first display device. Furthermore, examples of criteria for determining whether to change the current behavior of the first display device to a new behavior or not include, but are not limited to, visual proximity (i.e. "line of sightedness") of the second display device to the first display device, and new sensory information, such as a particular image captured by a webcam or a particular sound source captured by a microphone associated with the second display device that also motivates the first display device to change its current behavior. In one embodiment of the invention, the "line of sightedness" between the first display device and the second display device correlates to effectiveness of presenting similar display contents in the first display device when the dynamically-changing event in the second display device has occurred. Likewise, in one embodiment of the invention, certain new sensory information captured by sensors associated with the second display device can motivate the first display device to change its behavior for more effective and/or personalized presentation of media contents.

Furthermore, in one embodiment of the invention, the determination for a change of behavior for the first display device in STEP 403 and STEP 404 can be based on a set of multiple-state rules or a series of rules, based on information gathered in STEP 402. For example, a plurality of new sensory information, new incoming data, and/or other dynamically-changing events from the second display device as well as the current behavior of the first display device can be input feeds to the set of multiple-state rules for determining a "next state" for the first display device, wherein the next state may be a "new behavior" state if the change of the current behavior is merited, or a loop-back to the current state if the change of the current behavior is not merited.

In one embodiment of the invention, applying multiple-state rules in a peer-to-peer distributed network of display devices can result in seamless collaboration and switchover of contents among a multiple number of display devices. For example, as a person walks down an aisle lined up with a row of display devices, the peer-to-peer distributed network of display devices operating the corresponding peer-to-peer distributed application programs can trigger a particular display device that has just reached the person's line of sight to continue showing a display content that is now out of line of sight from another display device. In this example, the line-of-sightedness can be collectively determined in real time by one or more webcams operatively attached to at least one display device in the row of display devices.

In another embodiment of the invention, the determination for the change of behavior for the first display device in STEP 403 and STEP 404 may simply based on a simple if-then condition or a single rule that does not require multiple states or multiple rules.

Then, as shown in STEP 405 of the method (400), if the first display device's behavior is changed to the new behavior, status information for the first display device can be updated by the first peer-to-peer distributed system application program, and subsequently be communicated to other peer display devices regarding the updated status of the first display device. In one embodiment of the invention, the updated status of the first display device may also trigger behavioral changes in other peer-to-peer connected display devices.

Figure 5:
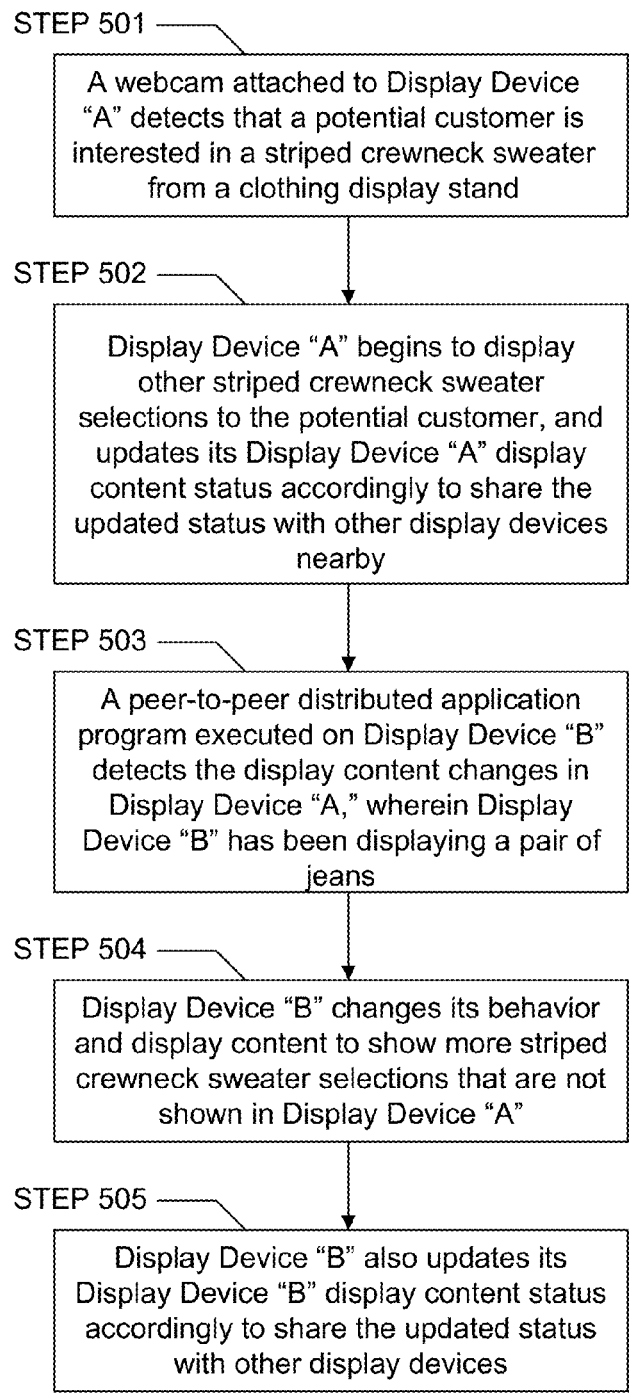
FIG. 5 shows an example of utilizing a system and a related method for determining one display device's behavior based on a dynamically-changing event associated with another display device, in accordance with an embodiment of the invention.

FIG. 5 shows an example (500) of utilizing a system and a related method for determining one display device's behavior based on a dynamically-changing event associated with another display device, in accordance with an embodiment of the invention. In this example (500), a webcam attached to Display Device "A" detects that a potential customer is interested in a striped crewneck sweater from a clothing display stand, as shown in STEP 501. Then, Display Device "A" begins to display other striped crewneck sweater selections to the potential customer, and updates its Device "A" display content status accordingly to share the updated status with other nearby display devices, as shown in STEP 502.

Subsequently, as shown in STEP 503, a peer-to-peer distributed application program executed on Display Device "B" detects the display content changes in Display Device "A" based on a peer-to-peer sharing of the updated status information, wherein Display Device "B" has been displaying a pair of jeans. Then, as shown in STEP 504, the peer-to-peer distributed application program executed on Display Device "B" determines that a display behavior change is desirable, and enables Display Device "B" to show striped crewneck sweater selections that are not shown in Display Device "A," instead of the pair of jeans that have been showing previously in Display Device "B." Furthermore, Display Device "B" also updates its Display Device "B" display content status accordingly to share the updated status with other display devices, as shown in STEP 505.

Figure 6:
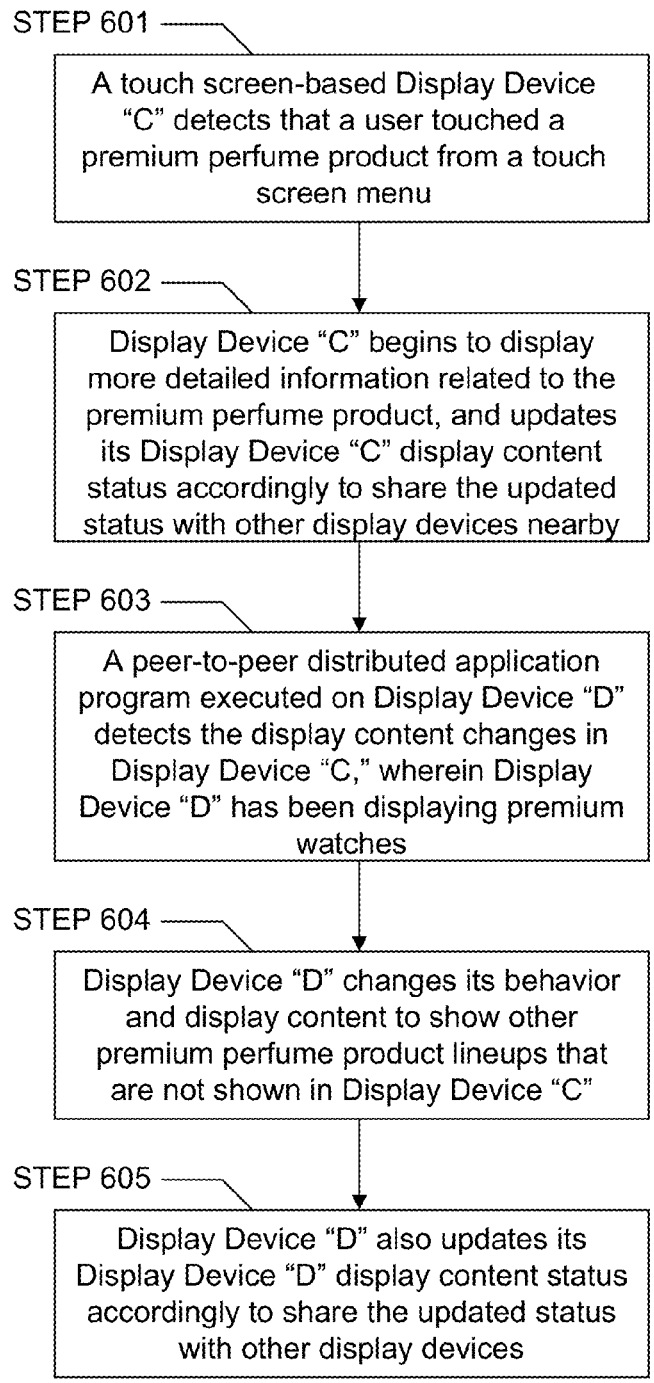
FIG. 6 shows another example of utilizing a system and a related method for determining one display device's behavior based on a dynamically-changing event associated with another display device, in accordance with an embodiment of the invention.

FIG. 6 shows another example (600) of utilizing a system and a related method for determining one display device's behavior based on a dynamically-changing event associated with another display device, in accordance with an embodiment of the invention. In this example (600), a touch screen-based Display Device "C" detects that a user touched a premium perfume product from a touch screen menu, as shown in STEP 601. Then, Display Device "C" begins to display more detailed information related to the premium perfume product, and updates its Device "C" display content status accordingly to share the updated status with other nearby display devices, as shown in STEP 602.

Subsequently, as shown in STEP 603, a peer-to-peer distributed application program executed on Display Device "D" detects the display content changes in Display Device "C" based on a peer-to-peer sharing of the updated status information, wherein Display Device "D" has been displaying premium watches. Then, as shown in STEP 604, the peer-to-peer distributed application program executed on Display Device "D" determines that a display behavior change is desirable, and enables Display Device "D" to show other premium perfume product lineups that are not shown in Display Device "C," instead of the premium watches that have been showing previously in Display Device "D." Furthermore, Display Device "D" also updates its Display Device "D" display content status accordingly to share the updated status with other display devices, as shown in STEP 605.

Figure 7:
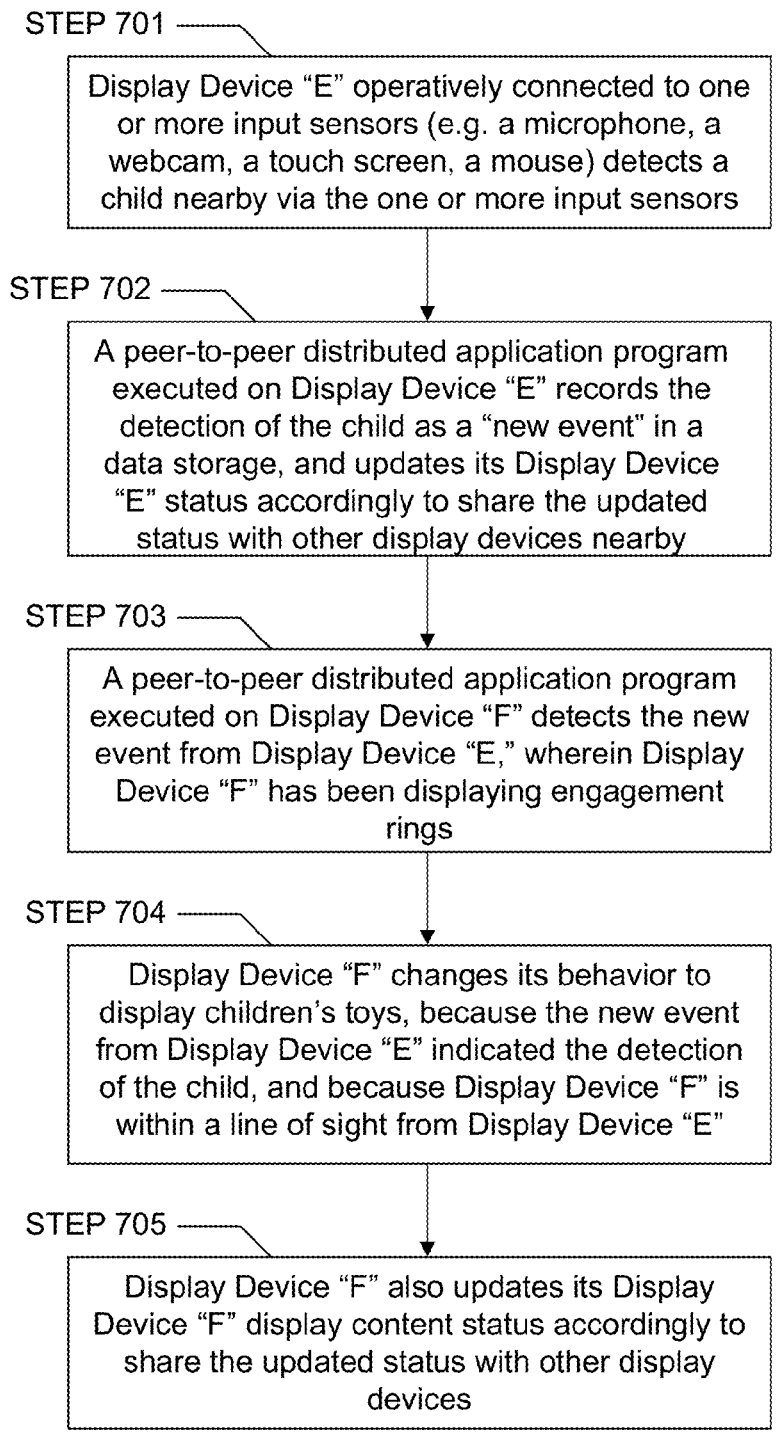
FIG. 7 shows another example of utilizing a system and a related method for determining one display device's behavior based on a dynamically-changing event associated with another display device, in accordance with an embodiment of the invention.

FIG. 7 shows another example (700) of utilizing a system and a related method for determining one display device's behavior based on a dynamically-changing event associated with another display device, in accordance with an embodiment of the invention. In this example (700), Display Device "E," which is operatively connected to one or more input sensors, such as a microphone, a webcam, a touch screen, a mouse, an RFID tag reader, and/or an NFC reader, detects a new presence of a child nearby using the one or more input sensors, as shown in STEP 701. Then, a peer-to-peer distributed application program executed on Display Device "E" records the detection of the child as a new event (i.e. new sensory information) in a data storage, and updates its Display Device "E" status accordingly to share the updated status with other display devices nearby on a peer-to-peer distributed data network, as shown in STEP 702.

Subsequently, as shown in STEP 703, a peer-to-peer distributed application program executed on Display Device "F" detects the new event (i.e. new sensory information) from Display Device "E" based on a peer-to-peer sharing of the updated status information, wherein Display Device "F" has been displaying engagement rings. Then, as shown in STEP 704, the peer-to-peer distributed application program executed on Display Device "F" determines that a display behavior change is desirable, and enables Display Device "F" to begin displaying children's toys instead of the engagement rings that have been showing previously in Display Device "F." Furthermore, Display Device "F" also updates its Display Device "F" display content status accordingly to share the updated status with other display devices, as shown in STEP 705.

Various embodiments of systems and related methods for determining a display device's behavior based on a dynamically-changing event associated with another display device have been illustrated in FIGS. 1~7 and described above. The present invention provides several advantages over conventional multiple display device configurations in a shopping mall, a commercial building, or another high-visibility location. By utilizing one or more peer-to-peer distributed system application programs for a cluster of display devices, various embodiments of the present invention are able to provide more personalized, coherent, and effective marketing and information presentation on multiple display devices when user-related new sensory information or another dynamically-changing event associated with a particular display device triggers other nearby display devices to adjust their behaviors in real time on a peer-to-peer network.

Furthermore, by providing a peer-to-peer distributed network configuration for a plurality of display device that do not have to depend on a centralized computer server for at least some aspects of display content management, content distribution, display device behavioral changes, and peer-to-peer information sharing, various embodiments of the present invention enable the network of display devices to be more fail-resilient and robust by avoiding a single point of operational failure caused by the centralized computer server in conventional display device connections.

In addition, various embodiments of the present invention also enable more personalized and adaptive information dissemination and marketing environments in shopping malls, commercial buildings, or other high-visibility locations by utilizing a plurality of display devices that can dynamically determine and change display contents or other behaviors of a cluster of nearby display devices based on a dynamically-changing event experienced by one particular display device in the cluster.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A peer-to-peer distributed data network system for a plurality of display devices, the peer-to-peer distributed data network system comprising:

a first display device comprising a camera, a first display panel, a first central processing unit (CPU), a first memory unit, a first graphics unit, a first power management unit, a first external communication interface, and a first input sensor interface, wherein the first CPU and the first memory unit execute a first type of peer-to-peer distributed system application that actively detects human presence near the first display device with the camera and maintains or changes the first display device's current behavior based on the human presence near the first display device and a second dynamically-changing event associated with a second display device, independent of commands from the second display device; and a second display device comprising a second display panel, a second central processing unit (CPU), a second memory unit, a second graphics unit, a second power management unit, a second external communication interface, and a second input sensor interface, wherein the second CPU and the second memory unit execute a second type of peer-to-peer distributed system application that maintains or changes the second display device's current behavior based on the human presence near the first display device, a first dynamically-changing event associated with the first display device, and a line-of-sightedness between the first display device and the second display device, independent of commands from the first display device.

2. The peer-to-peer distributed data network system of claim 1, wherein the first type of peer-to-peer distributed system application executed in the first display device keeps track of which other display devices are currently and operatively connected to the first display device for peer-to-peer communication.

3. The peer-to-peer distributed data network system of claim 1, wherein the second type of peer-to-peer distributed system application executed in the second display device keeps track of which other display devices are currently and operatively connected to the second display device for peer-to-peer communication.

4. The peer-to-peer distributed data network system of claim 1, wherein the first external communication interface of the first display device is operatively connected to the second external communication interface of the second display device to share a status update related to a change of display content or new sensory information from the first display device or the second display device.

5. The peer-to-peer distributed data network system of claim 1, wherein the first dynamically-changing event or the second dynamically-changing event is a change of display content, new sensory information, or another new event for the first display device or the second display device.

6. The peer-to-peer distributed data network system of claim 1, wherein the first display device's current behavior or the second display device's current behavior involves at least one of displaying a particular display content, providing a particular interactive user interface menu to a user via a touch screen of the first display panel or the second display panel, and providing a certain audio output to the first display device or the second display device.

7. The peer-to-peer distributed data network system of claim 1, wherein a change in the first display device's current behavior involves at least one of switching from a currently-shown content to a new display content, switching from a currently-used user interface menu to a different user interface menu, and changing audio volume of the first display device, if the second dynamically-changing event associated with the second display device triggers the first type of peer-to-peer distributed system application to initiate the change in the first display device's current behavior.

8. The peer-to-peer distributed data network system of claim 1, wherein a change in the second display device's current behavior involves at least one of switching from a currently-shown content to a new display content, switching from a currently-used user interface menu to a different user interface menu, and changing audio volume of the second display device, if the first dynamically-changing event associated with the first display device triggers the second type of peer-to-peer distributed system application to initiate the change in the second display device's current behavior.

9. The peer-to-peer distributed data network system of claim 1, wherein the first input sensor interface of the first display device or the second input sensor interface of the second display device is operatively connected to at least one of a touch screen sensor, a microphone, a webcam, a mouse, an RFID reader, and an NFC reader.

10. The peer-to-peer distributed data network system of claim 1, wherein the first display device or the second display device further comprises a camera processing unit, a wireless transceiver unit, a local data storage configured to contain the first type of peer-to-peer distributed system application or the second type of peer to peer distributed system application.

11. The peer-to-peer distributed data network system of claim 1, wherein the first graphics unit enables display of graphical information in the first display panel, and wherein the first power management unit receives and regulates electrical power from a power source, which may be from an electrical outlet or a battery.

12. The peer-to-peer distributed data network system of claim 1, wherein the second graphics unit enables display of graphical information in the second display panel, and wherein the second power management unit receives and regulates electrical power from a power source, which may be from an electrical outlet or a battery.

13. The peer-to-peer distributed data network system of claim 10, wherein the local data storage of the first display device or the second display device also stores one or more display contents.

14. The peer-to-peer distributed data network system of claim 1, further comprising a cloud network operatively connected to the first external communication interface and the second external communication interface, wherein the cloud network provides a remotely-connected data storage for the first display device and the second display device.

15. The peer-to-peer distributed data network system of claim 14, further comprising a computer server operatively connected to the cloud network, the first display device, and the second display device.

16. A method for determining a first display device's behavior based on a dynamically-changing event associated with a second display device, the method comprising the steps of:

executing a first type of peer-to-peer distributed system application program on a first CPU and a first memory unit of the first display device, wherein the first type of peer-to-peer distributed system application program keeps track of which other display devices are currently and operatively connected to the first display device for peer-to-peer communication;

executing a second type of peer-to-peer distributed system application program different from the first type on a second CPU and a second memory unit of the second display device connected to a camera, wherein the second type of peer-to-peer distributed system application program actively detects human presence near the second display device with the camera and keeps track of which other display devices are currently and operatively connected to the second display device for the peer-to-peer communication;

detecting the human presence or another dynamically-changing event from the second display device using the camera and the second type of peer-to-peer distributed system application program of the second display device;

determining proactively, independent of commands from the second display device, whether the human presence near the second display device or another dynamically-changing event from the second display device while forming a line of sight between the first display device and the second display device merits a change in the first display device's behavior using the first peer-to-peer distributed system application program of the first display device; and if the dynamically-changing event from the second display device merits the change in the first display device's behavior:

changing the first display device's behavior to a new behavior;

updating a status for the first type of peer-to-peer distributed system application program; and communicating to the second display device and any other connected display devices regarding the updated status of the first display device.

17. The method of claim 16, wherein the dynamically-changing event from the second display device involves a change of display content, new sensory information, or another new event for the second display device.

18. The method of claim 16, wherein the first display device's behavior involves at least one of displaying a particular display content, providing a particular interactive user interface menu to a user via a touch screen of the first display panel, and providing a certain audio output to the first display device.

19. The method of claim 16, wherein a change in the first display device's behavior involves at least one of switching from a currently-shown content to a new display content, switching from a currently-used user interface menu to a different user interface menu, and changing audio volume of the first display device, if the dynamically-changing event associated with the second display device triggers the first type of peer-to-peer distributed system application to initiate the change in the first display device's behavior.

20. The method of claim 16, wherein at least one of the first type of peer-to-peer distributed system application program and the second type of peer-to-peer distributed system application program keeps a peer-to-peer communication device priority list, which prioritizes an order of communication among the first display device, the second display device, and any other display devices mutually connected to each other for the peer-to-peer communication.

* * * * *